United States Patent
Laneman et al.

(10) Patent No.: US 11,905,174 B2
(45) Date of Patent: Feb. 20, 2024

(54) METHOD FOR PREPARING IODOSILANES

(71) Applicant: ENTEGRIS, INC., Billerica, MA (US)

(72) Inventors: Scott A. Laneman, Vernon Hills, IL (US); Jonathan W. Dube, Bowmanville (CA); James M. Stubbs, Port Perry (CA)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 17/505,685

(22) Filed: Oct. 20, 2021

(65) Prior Publication Data

US 2022/0127149 A1   Apr. 28, 2022

Related U.S. Application Data

(60) Provisional application No. 63/104,910, filed on Oct. 23, 2020.

(51) Int. Cl.
    *C01B 33/107*   (2006.01)

(52) U.S. Cl.
    CPC .................................. *C01B 33/107* (2013.01)

(58) Field of Classification Search
    CPC .................................................. C01B 33/107
    See application file for complete search history.

(56) References Cited

U.S. PATENT DOCUMENTS

| | | | |
|---|---|---|---|
| 9,701,695 B1 * | 7/2017 | Kuchenbeiser et al. | C07F 7/025 |
| 10,106,425 B2 | 10/2018 | Kerrigan | |
| 10,384,944 B2 * | 8/2019 | Ritter | C01B 33/107 |
| 2016/0264426 A1 | 9/2016 | Kerrigan | |

FOREIGN PATENT DOCUMENTS

| | | | | |
|---|---|---|---|---|
| WO | WO2017044690 A1 * | 3/2017 | ............ | C23C 16/34 |
| WO | WO 2017106615 A1 * | 6/2017 | ............ | C07F 7/10 |

OTHER PUBLICATIONS

Voronkov et al. Russian J. Org. Chem. 2007, 43, 1751-1753 (Year: 2007).*
Ackerhans et al. Inorg. Chem. 2001, 40, 3766-3773 (Year: 2001).*
Hoffmann et al. Synthesis 1981, 9, 715-719 (Year: 1981).*
Voronkov et al. Russian J. Org. Chem. 2008, 44, 1585-1589 (Year: 2008).*
Tacke et al Journal of Organometallic Chemistry, 354 (1988) 139-146 (Year: 1988).*
Gupper, A. et al., "Synthesis and Properties of 1,2-Dichlorodisilane and 1,1,2-Trichlorodisilane", European journal of Inorganic chemistry, 2001, vol. 2001, No. 8, pp. 2007-2011.
Hassler, K. et al., Syntheses, Infrared and Raman Vibrational Spectra, Normal Coordinate Analyses and 29Si-NMR- Spectra of Halogenated Disilanes, XnSi2H6-n(X=F, Cl, Br, I), Journal of molecular structure, 1995, vol. 348, pp. 353-356.
Voronkov, M.G. et al.; "Acyl Iodides in Organic Synthesis: XII. * Reactions with Organosilicon Amines"; Russian Journal of Organic Chemistry, 2008, vol. 44, No. 11, pp. 1585-1589.
Keinan, E. et al.; "Diiodosilane A Novel Reagent for Deoxygenation of Alcohols and Ethers"; J. Org. Chem., 1987, vol. 52, pp. 4846-4851.
Troyanov, S. et al.; "Synthesis of arene Ti and Zr complexes and their reactivity towards air: crystal structure of [(C6H3Me3)2Zr(AlCl4)](Al2Cl7) and TiCl3 (OPh)"; Journal of Organometallic Chemistry 494 (1995) C4-C7.

* cited by examiner

*Primary Examiner* — Anthony J Zimmer
*Assistant Examiner* — Jordan W Taylor

(57) ABSTRACT

Provided is methodology for the preparation of highly-desired iodosilanes such as $H_2SiI_2$ and $HSiI_3$, via a reaction of alkylaminosilanes with certain substituted acid iodides. In one embodiment, bis(diethylamino)silane is reacted with benzoyl iodide to provide diiodosilane.

21 Claims, No Drawings

METHOD FOR PREPARING IODOSILANES

CROSS-REFERENCE TO RELATED APPLICATION

This application claims priority under 35 U.S.C. 119(e) to U.S. Provisional Application No. 63/104,910, filed Oct. 23, 2020, incorporated herein by reference in its entirety.

TECHNICAL FIELD

This invention belongs to the field of silicon chemistry. In particular, it relates to methodology for preparing di- and tri-iodosilanes.

BACKGROUND

Halosilanes are useful as precursors in the manufacturing of microelectronic devices; in particular, halosilanes such as $H_2SiI_2$ and $HSiI_3$ are useful as precursor compounds for the deposition of silicon-containing films used in the manufacture of microelectronic devices. Current solution based synthetic methodology describes the synthesis of $H_2SiI_2$ and other select iodosilanes from (i) aryl silanes (Keinan et al. J. Org. Chem., Vol. 52, No. 22, 1987, pp. 4846-4851; Kerrigan et. al. U.S. Pat. No. 10,106,425 or (ii) halosilanes such as $SiH_2Cl_2$ (U.S. Pat. No. 10,384,944).

Keinan et al. describe a synthetic method towards $SiH_2I_2$ formation that employs stoichiometric treatment of Phenyl-$SiH_3$, an arylsilane, with iodine in the presence of a catalyst such as ethyl acetate. The reaction by-products are the aromatic function from the arylsilane, liberated as benzene, and a complicated by-product mixture resulting from ethyl acetate decomposition. Tedious separation of the reaction by-products from the desired $SiH_2I_2$ complicates the process. In addition, arylsilane-based methods for preparing halosilanes typically generate product contaminated with iodine and/or hydrogen iodide, which are deleterious to the desired iodosilane product, so often antimony, silver, or copper are utilized to stabilize the iodosilane product.

U.S. Pat. No. 10,106,425 teaches the use of an arylsilane, $(CH_3C_6H_4)SiH_3$, as reactant. The process as disclosed generates toluene as a by-product and is thus claimed as a less hazardous alternative to the Keinan method which generates benzene from Phenyl-$SiH_3$. U.S. Pat. No. 10,384,944 describes a halide exchange between, for example, LiI and $SiH_2Cl_2$, thereby generating LiCl and $SiH_2I_2$ in a halogen exchange reaction.

SUMMARY

In summary, the invention provides methodology for preparing highly desired iodosilanes such as $H_2SiI_2$ and $HSiI_3$, via treatment of certain dialkylamido-silanes with an acyl iodide. In one example, diiodosilane can be prepared from the reaction of bis(diethylamino)silane with benzoyl iodide. The reaction surprisingly results in the substitution of the alkylamino group on the aminosilane with an iodo group. This transformation readily occurs at room temperature and atmospheric pressure and can be conducted neat as well as in the presence of aprotic solvents.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g. 1 to 5 includes 1, 1.5, 2, 2.75, 3, 3.80, 4 and 5).

In a first aspect, the disclosure provides a method for preparing a compound having the formula (I):

$$(H)_xSi(I)_y \qquad (I);$$

wherein x is 1 or 2, y is 2 or 3, and the sum of x plus y is 4, the method comprising:
contacting a compound of the formula (A):

$$(H)_xSi(N(R^1)(R^2))_y \qquad (A);$$

wherein (i) each $R^1$ and each $R^2$ is independently chosen from a $C_1$-$C_6$ alkyl group, a $C_3$-$C_8$ cycloaliphatic group, or hydrogen, or (ii) $R^1$ and $R^2$ are taken together with the nitrogen atom to which they are bonded to form a $C_4$-$C_7$ nitrogen-containing saturated or aromatic ring, provided that no more than one of $R^1$ and $R^2$ is hydrogen;
with a compound of the formula:

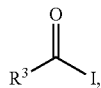

wherein $R^3$ is chosen from $C_1$-$C_6$ alkyl, $C_1$-$C_6$ substituted alkyl, benzyl, substituted benzyl, biphenyl, naphthyl, phenyl, or substituted phenyl, to produce a compound of formula (I).

In a second aspect, the disclosure provides a method for preparing a compound having the formula (II):

$$(H)_z(I)_ySi-Si(I)_y(H)_z \qquad (II)$$

wherein y is 2 or 3, z is 0 or 1, and the sum of y and z is 3, the method comprising: contacting a compound of the formula (B):

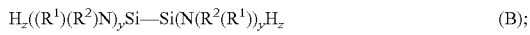

$$H_z((R^1)(R^2)N)_ySi-Si(N(R^2)(R^1))_yH_z \qquad (B);$$

wherein (i) each $R^1$ and each $R^2$ is independently chosen from a $C_1$-$C_6$ alkyl group, a $C_3$-$C_8$ cycloaliphatic group, or hydrogen, or (ii) $R^1$ and $R^2$ are taken together with the nitrogen atom to which they are bonded to form a $C_4$-$C_7$ nitrogen-containing saturated or aromatic ring, provided that no more than one of $R^1$ and $R^2$ is hydrogen;
with a compound of the formula:

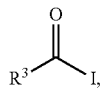

wherein $R^3$ is chosen from $C_1$-$C_6$ alkyl, $C_1$-$C_6$ substituted alkyl, benzyl, substituted benzyl, biphenyl, naphthyl, phenyl, or substituted phenyl, to produce a compound of formula (II).

In the above process, it will be appreciated that the product of formula (I) is produced when the reactant of formula (A) is utilized and the product of formula (II) is produced when the reactant of formula (B) is utilized. In one embodiment, the compound of formula (I) is $H_2SiI_2$. In another embodiment, the compound of formula (I) is $HSiI_3$.

In one embodiment, the compound of the formula

is chosen from compounds such as
$H_2Si(N(CH_3)_2)_2$;
$H_2Si(N(CH_2CH_3)_2)_2$;
$H_2Si(N(CH_2CH_3)(CH_3))_2$;
$H_2Si(N(CH_2CH_2CH_3)_2)_2$;
$H_2Si(N(CH_2CH_2CH_2CH_3)_2)_2$;
$H_2Si(N(t-butyl)_2)_2$;
$H_2Si(N(H)(t-butyl))_2$;
$HSi(N(CH_3)_2)_3$;
$HSi(N(CH_2CH_3)_2)_3$;
$HSi(N(CH_2CH_2CH_3)_2)_3$;
$HSi(N(CH_2CH_2CH_2CH_3)_2)_3$;
$HSi(N(t-butyl)_2)_3$; and the like.

As used herein, the term "substituted phenyl" denotes a phenyl group substituted one to five times with a group chosen from $C_1$-$C_6$ alkyl, $C_1$-$C_6$ alkylamino, di-($C_1$-$C_6$ alkyl)amino, and halo. In one embodiment, halo is fluoro.

As used herein, the term "substituted $C_1$-$C_6$ alkyl" denotes a $C_1$-$C_6$ alkyl group substituted one to five times with a group chosen from $C_1$-$C_6$ alkylamino, di-($C_1$-$C_6$ alkyl)amino, and halo.

As used herein, the term "substituted benzyl" denotes a benzyl group having one to five substituents on the aromatic ring chosen from $C_1$-$C_6$ alkylamino, di-($C_1$-$C_6$ alkyl)amino, and halo.

The methodology of the invention can be practiced neat or in the presence of an aprotic solvent which is non-reactive with the starting materials or iodosilane products. Such solvents include aliphatic, aromatic, and halogenated hydrocarbon solvents which are devoid of moieties and functional groups such as oxygen, esters, carboxy groups, and ketones. Examples include benzene, toluene, hexane, cyclohexane, pentane, dichloromethane, 1,2-dichloroethane, tetralin, decalin, mesitylene, dibromoethane, tetrachloroethylene, or chlorobenzene, and the like.

The reaction generally proceeds at room temperature and atmospheric pressure.

The method for preparing the precursor compounds of the invention can be conducted in standard batch or continuous mode reactors. One of ordinary skill in the art would recognize the scale and type of reactors which could be utilized in the context of the reagents and products so produced.

Compounds of the formulae (I) and (II) are useful as precursors in the formation of silicon-containing films on the surface of a microelectronic device by methods such as atomic layer deposition (see for example, U.S. Pat. Nos. 10,580,645 and 10,424,477, incorporated herein by reference). Also, by way of example, compounds of formulae (I) and (II) can be introduced into a deposition chamber for the purposes of thermal CVD or ALD, or for the purposes of performing plasma-enhanced ALD or CVD. In these cases, a co-reactant gas can be introduced to deposit an $SiO_2$ film, via oxidation in an oxidizing environment with $O_2$, $O_3$, $N_2O$, or mixtures thereof. Similarly, compounds of formulae (I) and (II) can be introduced into a deposition chamber for the purposes of thermal CVD or ALD, or for the purposes of performing plasma-enhanced ALD or CVD. In these cases, a co-reactant gas can be introduced to deposit a silicon nitride film, via nitridation with $N_2$, $NH_3$, hydrazine or alkylhydrazine containing mixtures. The deposited films serve as dielectric layers within the microelectronic device.

EXAMPLES

Example 1: Diiodosilane

A 25.0 g (143 mMol) sample of bis(diethylamino)silane was combined with 4 equivalents, 133.0 g (574 mMol) of benzoyl iodide and 500 mL of hexanes. The reaction was allowed to proceed for 2 hours, after which time, the desired diiodosilane product was detected by $^1$H NMR and all starting material was consumed. In the case of addition of benzoyl iodide to bis(diethylamino)silane, the observed yield was 7% (determined from concentration in hexanes). In the case of addition of bis(diethylamino)silane to benzoyl iodide, the observed yield was 3.5% (determined from concentration in hexanes). NMR samples were spiked to confirm with diiodosilane to confirm the identity of the signal.

$^1$H NMR (400 MHz, $C_6D_6$): δ 3.61 ($^1J_{Si-H}$=141.5 Hz, H—$SiI_2$, 2H).

Example 2: Diiodosilane

A 20.0 g (115 mMol) sample of bis(diethylamino)silane was combined with 4 equivalents, 78.0 g (459 mMol) of acetyl iodide and 400 mL of hexanes. The reaction was allowed to proceed for 10 minutes, after which time, trace amounts of the desired diiodosilane product was detected by $^1$H NMR and all starting material was consumed. Upon attempted isolation, decomposition of the product occurred. In the case of addition of acetyl iodide to bis(diethylamino)silane, the observed isolated yield was 0%.

$^1$H NMR (400 MHz, $C_6D_6$): δ 3.61 ($^1J_{Si-H}$=141.5 Hz, H—$SiI_2$, 2H).

Example 3: Diiodosilane

A 0.68 g (3.9 mMol) sample of bis(diethylamino)silane was combined with 4 equivalents, 4.69 g (15.6 mMol) of 2-fluorobenzoyl iodide and 10 mL of hexanes. The reaction was allowed to proceed for 10 minutes, after which time, 43% conversion of the desired diiodosilane product was detected by $^1$H NMR and all starting material was consumed. After an additional, 20 hr of stirring, the case of addition of 2-fluorobenzoyl iodide to bis(diethylamino)silane, the observed yield was 20%.

$^1$H NMR (400 MHz, $C_6D_6$): δ 3.61 ($^1J_{Si-H}$=141.5 Hz, H—$SiI_2$, 2H).

Example 4: Diiodosilane

A 0.27 g (1.6 mMol) sample of bis(diethylamino)silane was combined with 4 equivalents, 2.3 g (6.2 mMol) of 3,5-difluorobenzoyl iodide and 5 mL of hexanes. The reaction was allowed to proceed for 10 minutes, after which time, 81% conversion of the desired diiodosilane product was detected by $^1$H NMR and all starting material was consumed. After an additional, 20 hr of stirring, the case of addition of 3,5-difluorobenzoyl iodide to bis(diethylamino)silane, the observed yield was 20%.

$^1$H NMR (400 MHz, $C_6D_6$): δ 3.61 ($^1J_{Si-H}$=141.5 Hz, H—$SiI_2$, 2H).

Example 5 Diiodosilane

A 3.3 g (18.9 mMol) sample of bis(diethylamino)silane was combined with 4 equivalents, 1.0 g (4.7 mMol) of 2,2-dimethylpropanoyl iodide and 3 mL of hexanes. The reaction was allowed to proceed for 10 minutes, after which time, 20% of the desired diiodosilane product was detected by 1H NMR with 72% of the starting material remaining. After an additional, 20 hr of stirring, the case of addition of 2,2-dimethylpropanoyl iodide to bis(diethylamino)silane, the observed yield was 0.1%.

$^1$H NMR (400 MHz, $C_6D_6$): δ 3.61 ($^1J_{Si-H}$=141.5 Hz, H—$SiI_2$, 2H).

ASPECTS

In a first aspect, the disclosure provides a method for preparing a compound having the formula (I):

wherein x is 1 or 2, y is 2 or 3, and the sum of x plus y is 4, the method comprising:
contacting a compound of the formula (A):

wherein (i) each $R^1$ and each $R^2$ is independently chosen from a $C_1$-$C_6$ alkyl group, a $C_3$-$C_8$ cycloaliphatic group, or hydrogen, or (ii) $R^1$ and $R^2$ are taken together with the nitrogen atom to which they are bonded to form a $C_4$-$C_7$ nitrogen-containing saturated or aromatic ring, provided that no more than one of $R^1$ and $R^2$ is hydrogen;
with a compound of the formula:

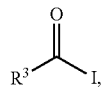

wherein $R^3$ is chosen from $C_1$-$C_6$ alkyl, $C_1$-$C_6$ substituted alkyl, benzyl, substituted benzyl, biphenyl, naphthyl, phenyl, or substituted phenyl, to produce a compound of formula (I).

In a second aspect, the disclosure provides the method of the first aspect, wherein the compound of formula (I) is $H_2SiI_2$.

In a third aspect, the disclosure provides the method of the first aspect, wherein the compound of formula (I) is $HSiI_3$.

In a fourth aspect, the disclosure provides the method of the first or second aspect, wherein $R^1$ and $R^2$ are chosen from methyl, ethyl, propyl, sec-butyl, and t-butyl.

In a fifth aspect, the disclosure provides the method of any one of the first through fourth aspects, wherein at least one of $R^1$ and $R^2$ is t-butyl.

In a sixth aspect, the disclosure provides the method of the first, second, or third aspects, wherein at least one of $R^1$ and $R^2$ is cyclohexyl.

In a seventh aspect, the disclosure provides the method of the first, second, or third aspects, wherein $R^1$ and $R^2$ are taken together with the nitrogen atom to which they are attached, to form a pyrrole, pyrrolidine, or piperidine ring.

In an eighth aspect, the disclosure provides the method of any one of the first through the seventh aspects, wherein $R^3$ is $C_1$-$C_5$ alkyl.

In a ninth aspect, the disclosure provides the method of any one of the first through seventh aspects, wherein $R^3$ is phenyl.

In a tenth aspect, the disclosure provides the method of any one of the first through seventh aspects, wherein $R^3$ is substituted phenyl.

In an eleventh aspect, the disclosure provides the method of any one of the first through seventh, or tenth aspects, wherein $R^3$ is 4-fluorophenyl.

In a twelfth aspect, the disclosure provides the method of any one of the first through seventh or tenth aspects, wherein $R^3$ is 3,5-difluorophenyl.

In a thirteenth aspect, the disclosure provides the method of the first, second, or third aspects, wherein at least one of $R^1$ and $R^2$ is ethyl and $R^3$ is methyl or phenyl.

In a fourteenth aspect, the disclosure provides a method for preparing a compound having the formula (II):

wherein y is 2 or 3, z is 0 or 1, and the sum of y and z is 3, the method comprising:
contacting a compound of the formula (B):

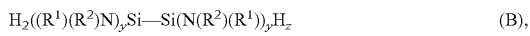

wherein (i) each $R^1$ and each $R^2$ is independently chosen from a $C_1$-$C_6$ alkyl group, a $C_3$-$C_8$ cycloaliphatic group, or hydrogen, or (ii) $R^1$ and $R^2$ are taken together with the nitrogen atom to which they are bonded to form a $C_4$-$C_7$ nitrogen-containing saturated or aromatic ring, provided that no more than one of $R^1$ and $R^2$ is hydrogen:
with a compound of the formula:

wherein $R^3$ is chosen from $C_1$-$C_6$ alkyl, $C_1$-$C_6$ substituted alkyl, benzyl, substituted benzyl, biphenyl, naphthyl, phenyl, or substituted phenyl, to produce a compound of formula (II).

In a fifteenth aspect, the disclosure provides the method of the fourteenth aspect, wherein $R^1$ and $R^2$ are chosen from methyl, ethyl, propyl, sec-butyl, and t-butyl.

In a sixteenth aspect, the disclosure provides the method of the fourteenth aspect, wherein at least one of $R^1$ or $R^2$ is t-butyl.

In a seventeenth aspect, the disclosure provides the method of the fourteenth aspect, wherein at least one of $R^1$ or $R^2$ is cyclohexyl.

In an eighteenth aspect, the disclosure provides the method of the fourteenth aspect, wherein $R^1$ and $R^2$ are taken together with the nitrogen atom to which they are attached, to form a pyrrole, pyrrolidine, or piperidine ring.

In a nineteenth aspect, the disclosure provides the method of any one of the fourteenth through eighteenth aspects, wherein $R^3$ is $C_1$-$C_6$ alkyl.

In a twentieth aspect, the disclosure provides the method of any one of the fourteenth through eighteenth aspects, wherein $R^3$ is phenyl.

In a twenty-first aspect, the disclosure provides the method of the fourteenth aspect, wherein at least one of $R^1$ and $R^2$ is ethyl and $R^3$ is methyl or phenyl.

Having thus described several illustrative embodiments of the present disclosure, those of skill in the art will readily appreciate that yet other embodiments may be made and used within the scope of the attached claims. Numerous advantages of the disclosure covered by this document have been set forth in the foregoing description. It will be understood, however, that this disclosure is, in many respects, only illustrative. Changes may be made in details without exceeding the scope of the disclosure. The disclosure's scope is, of course, defined in the language in which the appended claims are expressed.

What is claimed is:

1. A method for preparing a compound having the formula (I):

$$(H)_xSi(I)_y \quad (I);$$

wherein x is 1 or 2, y is 2 or 3, and the sum of x plus y is 4, the method comprising:
contacting a compound of the formula (A):

$$(H)_xSi(N(R^1)(R^2))_y \quad (A);$$

wherein (i) each $R^1$ and each $R^2$ is independently chosen from a $C_1$-$C_6$ alkyl group, a $C_3$-$C_8$ cycloaliphatic group, or hydrogen, or (ii) $R^1$ and $R^2$ are taken together with the nitrogen atom to which they are bonded to form a $C_4$-$C_7$ nitrogen-containing saturated or aromatic ring, provided that no more than one of $R^1$ and $R^2$ is hydrogen;
with a compound of the formula:

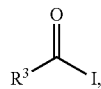

wherein $R^3$ is chosen from $C_1$-$C_6$ alkyl, $C_1$-$C_6$ substituted alkyl, benzyl, substituted benzyl, biphenyl, naphthyl, phenyl, or substituted phenyl,
to produce a compound of formula (I).

2. The method of claim 1, wherein the compound of formula (I) is $H_2SiI_2$.

3. The method of claim 1, wherein the compound of formula (I) is $HSiI_3$.

4. The method of claim 1, wherein $R^1$ and $R^2$ are chosen from methyl, ethyl, propyl, sec-butyl, and t-butyl.

5. The method of claim 1, wherein at least one of $R^1$ and $R^2$ is t-butyl.

6. The method of claim 1, wherein at least one of $R^1$ and $R^2$ is cyclohexyl.

7. The method of claim 1, wherein $R^1$ and $R^2$ are taken together with the nitrogen atom to which they are attached, to form a pyrrole, pyrrolidine, or piperidine ring.

8. The method of claim 1, wherein $R^3$ is $C_1$-$C_6$ alkyl.

9. The method of claim 1, wherein $R^3$ is phenyl.

10. The method of claim 1, wherein $R^3$ is substituted phenyl.

11. The method of claim 10, wherein $R^3$ is 4-fluorophenyl.

12. The method of claim 10, wherein $R^3$ is 3,5-difluorophenyl.

13. The method of claim 1, wherein at least one of $R^1$ and $R^2$ is ethyl and $R^3$ is methyl or phenyl.

14. A method for preparing a compound having the formula (II):

$$(H)_z(I)_ySi-Si(I)_y(H)_z \quad (II)$$

wherein y is 2 or 3, z is 0 or 1, and the sum of y and z is 3, the method comprising:
contacting a compound of the formula (B):

$$H_z((R^1)(R^2)N)_ySi-Si(N(R^2)(R^1))_yH_z \quad (B);$$

wherein (i) each $R^1$ and each $R^2$ is independently chosen from a $C_1$-$C_6$ alkyl group, a $C_3$-$C_8$ cycloaliphatic group, or hydrogen, or (ii) $R^1$ and $R^2$ are taken together with the nitrogen atom to which they are bonded to form a $C_4$-$C_7$ nitrogen-containing saturated or aromatic ring, provided that no more than one of $R^1$ and $R^2$ is hydrogen;
with a compound of the formula:

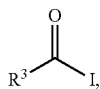

wherein $R^3$ is chosen from $C_1$-$C_6$ alkyl, $C_1$-$C_6$ substituted alkyl, benzyl, substituted benzyl, biphenyl, naphthyl, phenyl, or substituted phenyl,
to produce a compound of formula (II).

15. The method of claim 14, wherein $R^1$ and $R^2$ are chosen from methyl, ethyl, propyl, sec-butyl, and t-butyl.

16. The method of claim 14, wherein at least one of $R^1$ or $R^2$ is t-butyl.

17. The method of claim 14, wherein at least one of $R^1$ or $R^2$ is cyclohexyl.

18. The method of claim 14, wherein $R^1$ and $R^2$ are taken together with the nitrogen atom to which they are attached, to form a pyrrole, pyrrolidine, or piperidine ring.

19. The method of claim 14, wherein $R^3$ is $C_1$-$C_6$ alkyl.

20. The method of claim 14, wherein $R^3$ is phenyl.

21. The method of claim 14, wherein at least one of $R^1$ and $R^2$ is ethyl and $R^3$ is methyl or phenyl.

* * * * *